(12) United States Patent
Sumser

(10) Patent No.: US 7,412,830 B2
(45) Date of Patent: Aug. 19, 2008

(54) COMPRESSOR IN THE INDUCTION TRACT OF AN INTERNAL COMBUSTION ENGINE

(75) Inventor: Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 300 days.

(21) Appl. No.: 11/316,667

(22) Filed: Dec. 22, 2005

(65) Prior Publication Data

US 2006/0218921 A1    Oct. 5, 2006

Related U.S. Application Data

(63) Continuation-in-part of application No. PCT/EP2004/006836, filed on Jun. 24, 2004.

(30) Foreign Application Priority Data

Jun. 30, 2003 (DE) ................. 103 29 281

(51) Int. Cl.
F02B 33/44 (2006.01)
F02B 37/22 (2006.01)
F02B 37/24 (2006.01)
F01D 17/16 (2006.01)
F01D 17/14 (2006.01)
F04D 27/00 (2006.01)

(52) U.S. Cl. .................... 60/605.1; 415/158; 415/162

(58) Field of Classification Search ......... 60/605.1, 60/611, 602; 415/167, 146–147, 158–159; F02B 37/22
See application file for complete search history.

(56) References Cited

U.S. PATENT DOCUMENTS

| 3,075,743 | A | * | 1/1963 | Sheets | 415/220 |
| 3,244,400 | A | * | 4/1966 | Saunders | 416/231 R |
| 4,558,987 | A | * | 12/1985 | Dittie | 415/162 |
| 6,378,307 | B1 | * | 4/2002 | Fledersbacher et al. | 60/611 |
| 6,634,174 | B2 | * | 10/2003 | Sumser et al. | 60/611 |
| 6,669,441 | B2 | * | 12/2003 | Bertnik et al. | 415/158 |
| 7,127,893 | B2 | * | 10/2006 | Schmid et al. | 415/158 |
| 2006/0096287 | A1 | * | 5/2006 | Sumser et al. | 60/605.1 |
| 2006/0117749 | A1 | * | 6/2006 | Sumser | 60/605.1 |

FOREIGN PATENT DOCUMENTS

CH    407401    * 2/1966
CH    668455 A5 * 12/1988

(Continued)

*Primary Examiner*—Thai-Ba Trieu
(74) *Attorney, Agent, or Firm*—Klaus J. Bach

(57) ABSTRACT

In a compressor in the induction tract of an internal combustion engine with a compressor by which combustion air can be compressed to an increased boost pressure and which includes a compressor wheel rotatably mounted in a compressor housing with a main inlet duct in the flow path to the compressor wheel, and an auxiliary inlet duct joining the main inlet duct in the area of the compressor wheel, an adjustable swirl device is provided in the auxiliary intake duct, which comprises two separate, interacting swirl structures with a plurality of guide vanes distributed over the periphery and arranged so that the flow cross-section between the guide vanes of the two swirl structures can be changed by an adjusting motion of at least one swirl structure, the vane height of the guide vanes of the smaller swirl structure being 5% to 35% of the vane height of the guide vanes of the larger swirl structure.

12 Claims, 4 Drawing Sheets

FOREIGN PATENT DOCUMENTS

| | | | |
|---|---|---|---|
| DE | 2403113 A | * | 8/1975 |
| DE | 3844189 A | * | 7/1990 |
| DE | 19955508 C1 | * | 4/2001 |
| DE | 10049198 A1 | * | 4/2002 |
| DE | 10233042 A1 | * | 2/2004 |
| DE | 10244536 A1 | * | 4/2004 |
| FR | 1303779 | * | 9/1962 |
| FR | 196967 A1 | * | 3/1986 |
| JP | 03249305 A | * | 11/1991 |

* cited by examiner

COMPRESSOR IN THE INDUCTION TRACT OF AN INTERNAL COMBUSTION ENGINE

This is a Continuation-In-Part Application of International Application PCT/EP2004/006836 filed Jun. 24, 2004 and claiming the priority of German application 103 29 281.0 filed Jun. 30, 2003.

BACKGROUND OF THE INVENTION

The invention relates to an intake air compressor for an internal combustion engine including a compressor wheel disposed in the air intake duct and an adjustable inlet guide vane structure for controlling the airflow to the compressor.

DE 199 55 508 C1 discloses an exhaust gas turbocharger for an internal combustion engine, which comprises an exhaust gas turbine in the exhaust gas duct and a compressor in the air intake duct of the internal combustion engine. The exhaust gas turbine is driven by the pressurized exhaust gases of the engine, the rotation of the turbine wheel being transmitted by a shaft to the compressor wheel, which compresses combustion air sucked from the environment to an increased boost pressure, at which the combustion air is fed to the cylinders of the internal combustion engine. In order to improve the transient behavior of the exhaust gas turbocharger, the compressor has, parallel to the compressor inlet duct, an auxiliary duct, which joins the compressor inlet duct in the area of the compressor wheel, an adjustable guide vane structure being disposed in the entrance area to the compressor wheel. At low loads and rotational speeds, in particular, the flow cross section in the compressor inlet duct can be reduced or shut off and the combustion air which is to be supplied can be conducted to the compressor wheel via the auxiliary duct. The combustion air passes through the flow guide structure and undergoes a swirl, under which the combustion air strikes the compressor wheel and imparts to the latter a driving momentum. This mode of operation of the compressor is also referred to as cold air turbine operation.

Based on this prior art, it is the object of the present invention to provide a compressor for an internal combustion engine in such a way that the compressor speed can be kept at a high level, even at low engine speeds and engine loads. Expediently, the air flow through the compressor is to be accurately controlled by simple design measures.

SUMMARY OF THE INVENTION

In a compressor in the induction tract of an internal combustion engine with a compressor by which combustion air can be compressed to an increased boost pressure and which includes a compressor wheel rotatably mounted in a compressor housing with a main inlet duct in the flow path to the compressor wheel, and an auxiliary inlet duct joining the main inlet duct in the area of the compressor wheel, an adjustable swirl device is provided in the auxiliary intake duct, which comprises two separate, interacting swirl structures with a plurality of guide vanes distributed over the periphery and arranged so that the flow cross-section between the guide vanes of the two swirl structures can be changed by an adjusting motion of at least one swirl structure.

Depending on the operating conditions of the internal combustion engine, the swirl structures can be adjusted to different relative positions, thereby altering the flow volumes and direction of the combustion air supplied to the compressor wheel. Thus the swirl device, particularly at low loads and rotational speeds, can be brought into a position which reduces the flow cross section by the two individual swirl structures as they are inserted into the flow cross section or brought into a position in which the guide vanes of both swivel structures lie directly adjacent to one another or, viewed over the periphery, engage in one another. The combustion air can flow through the remaining flow channels between adjacent guide vanes and, in so doing, can undergo a swirl, which, when the compressor wheel blades are struck, imparts a driving momentum to the compressor wheel, so that the compressor wheel can be kept at an increased rotational speed level, even at very low loads and speeds of the internal combustion engine.

The compressor preferably forms an integral part of an exhaust gas turbocharger and is coupled by a shaft to the turbine wheel of an exhaust gas turbine. At low loads and speeds of the internal combustion engine, the energy of the exhaust gas is insufficient to keep the supercharger speed at a high level. In these operating situations, the compressor can be run in the cold air turbine operating mode previously described, in which a pressure difference between compressor inlet side and compressor outlet side can be utilized to drive the supercharger and, moreover, through the cross-sectional adjustment by means of the two swirl structures, the combustion air striking the compressor wheel is subjected to a propellant swirl.

Preferably, the two swirl structures are disposed in the mouth region between the auxiliary duct and the compressor inlet duct. Such an auxiliary duct can be provided, in particular, so as to extend roughly parallel to the compressor inlet duct and can join the compressor inlet duct roughly in the area of the compressor wheel in the axial direction. The combustion air to be supplied via the auxiliary duct is subjected to a swirl in the mouth region as it flows through the swirl device and then directly strikes the compressor wheel blades. The combustion air is supplied via the auxiliary duct, in particular, in the engine operating ranges covering low load and low rotational speed; in this operating range, the main compressor inlet duct can be shut off with the aid of a blocking member.

Advantageously, the adjusting motion of the swirl device is performed via an axial displacement motion of at least one of the two swirl structures. This can be realized, for example, in such a way that the guide vanes of the swirl device are supported on opposite wall portions of the flow cross section, at least one of the two wall portions being axially displaceable. Via a displacement motion of the particular wall portion, the cross-sectional area of the flow cross section can be controlled and the guide vanes disposed thereon can be adjusted. When the two swirl structures come closer together, the flow cross-section is reduced and the remaining flow area is formed by the guide vanes of the two mutually approaching swirl structures. Particularly in the case of different vane height and/or width, the effect can be obtained that, when the two swirl structures come closer together, initially only the axially wider guide vanes are effective, which extend over a larger cross-sectional width of the mouth opening, whereas the axially narrower guide vanes extend only over a part of the mouth cross-section and have no or only minor influence on the flow of the combustion air. When the two vane structures come still closer together, in addition to the wider guide vanes also the narrower guide vanes are disposed within the now reduced air flow cross-section, with the result that the air flow is influenced by the guide vanes of both swirl structures.

In order to allow the two swirl structures to come closer together in an unobstructed manner, on the opposing wall regions of the mouth cross-section there are advantageously provided receiving pockets for accommodating the guide vanes of a respective swirl structure.

The guide vanes of the two swirl structures interact in a position in which the flow-cross section is reduced. This is achieved, for example, by virtue of the fact that, viewed over the periphery of the swirl device, the guide vanes of one swirl structure lie between adjacent guide vanes of the other swirl structure, so that the guide vanes of the different swirl structures are arranged alternately in the peripheral direction. Since the guide vanes can have different sizes and shapes, different flow ratios are set by the two swirl structures being moved together.

Additionally or alternatively to a positioning of the guide vanes of a swirl device in the intermediate spacing between adjacent guide vanes of the other swirl structure, it may also be expedient for the guide vanes of one swirl structure to be positioned on the end face of the guide vanes of the other swirl structure. This provides for a lengthening of the guide vanes, whereby an enhanced swirl can be obtained. Through the interaction of the guide vanes of the two swirl structures, a Laval nozzle channel can be formed in the space between adjacent guide vanes, whereby high flow velocities and even a supersonic flow of the combustion air flowing therethrough can be obtained.

The invention and expedient embodiments thereof will be described in greater detail on the basis of the accompanying drawings.

DESCRIPTION OF PREFERRED EMBODIMENTS

In the figures, identical components are provided with identical reference symbols.

Figure 1:
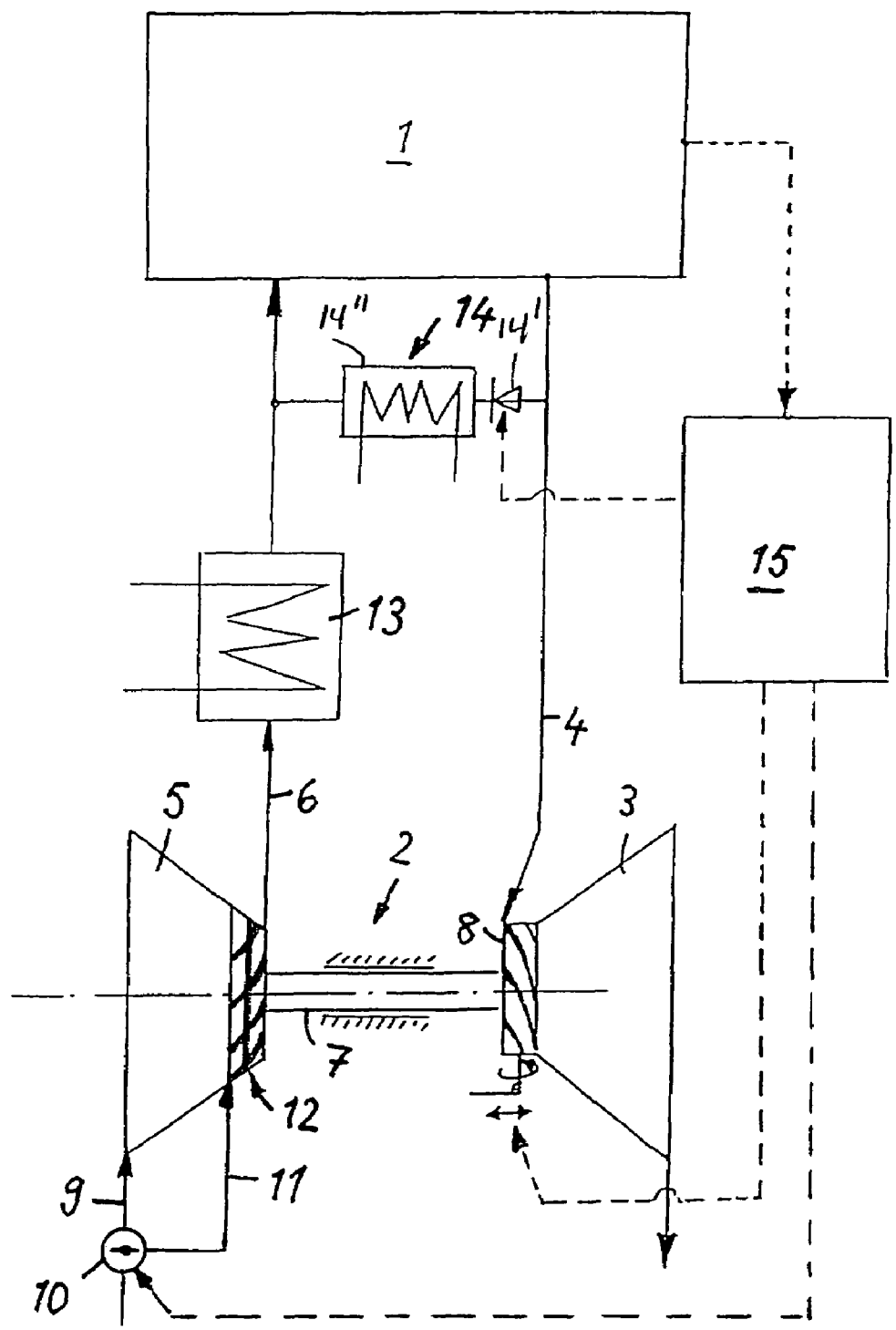
FIG. 1 shows diagrammatically a supercharged internal combustion engine having an exhaust gas turbocharger with a compressor including a main compressor inlet duct and an auxiliary inlet duct which joins the main compressor inlet duct in the area of the compressor wheel where two separate swirl structures are disposed.

The internal combustion engine 1 represented in FIG. 1-a gasoline engine or a diesel engine includes an exhaust gas turbocharger 2 having an exhaust gas turbine 3 disposed in the exhaust gas system 4 and a compressor 5 disposed in the induction tract 6. A turbine wheel of the exhaust gas turbine 3 is driven by the exhaust gases of the internal combustion engine, which exhaust gases are under exhaust gas backpressure, the turbine wheel rotation being transmitted by a shaft 7 to a compressor wheel in the compressor, whereupon combustion air is sucked from the environment and compressed to an increased boost pressure. The exhaust gas turbine 3 is provided with a variable turbine geometry 8 for the adjustment of the effective turbine entry cross section. The compressor 5 has in a compressor inlet duct 9 an adjustable blocking member 10, by which the quantity of combustion air to be supplied can be set. Branching off from the compressor inlet duct 9 is an auxiliary duct 11, which joins the compressor inlet duct in the area of the compressor wheel, the mouth region containing a swirl device 12 comprising two individual, interacting vane structures. The quantity of combustion air to be supplied via the auxiliary duct 11 can likewise be controlled by the blocking member 10.

Downstream of the compressor 5, the induction duct 6 includes a charge-air cooler 13, in which the compressed combustion air, which is subsequently fed under boost pressure to the cylinders of the internal combustion engine, is cooled.

In addition, an exhaust gas recirculation system 14 is provided, which comprises a return line between the exhaust gas system upstream of the exhaust gas turbine 3 and the induction tract downstream of the charge-air cooler 13. The return line includes an adjustable recirculation valve 14' and an exhaust gas cooler 14" disposed downstream of the recirculation valve 14'.

By means of a control unit 15, the various units assigned to the internal combustion engine, particularly the variable turbine geometry 8, the blocking member 10 of the compressor 5 and the recirculation valve 14' of the exhaust gas recirculation system 14, can be set as a function of the operating parameters of the internal combustion engine.

Figure 2:
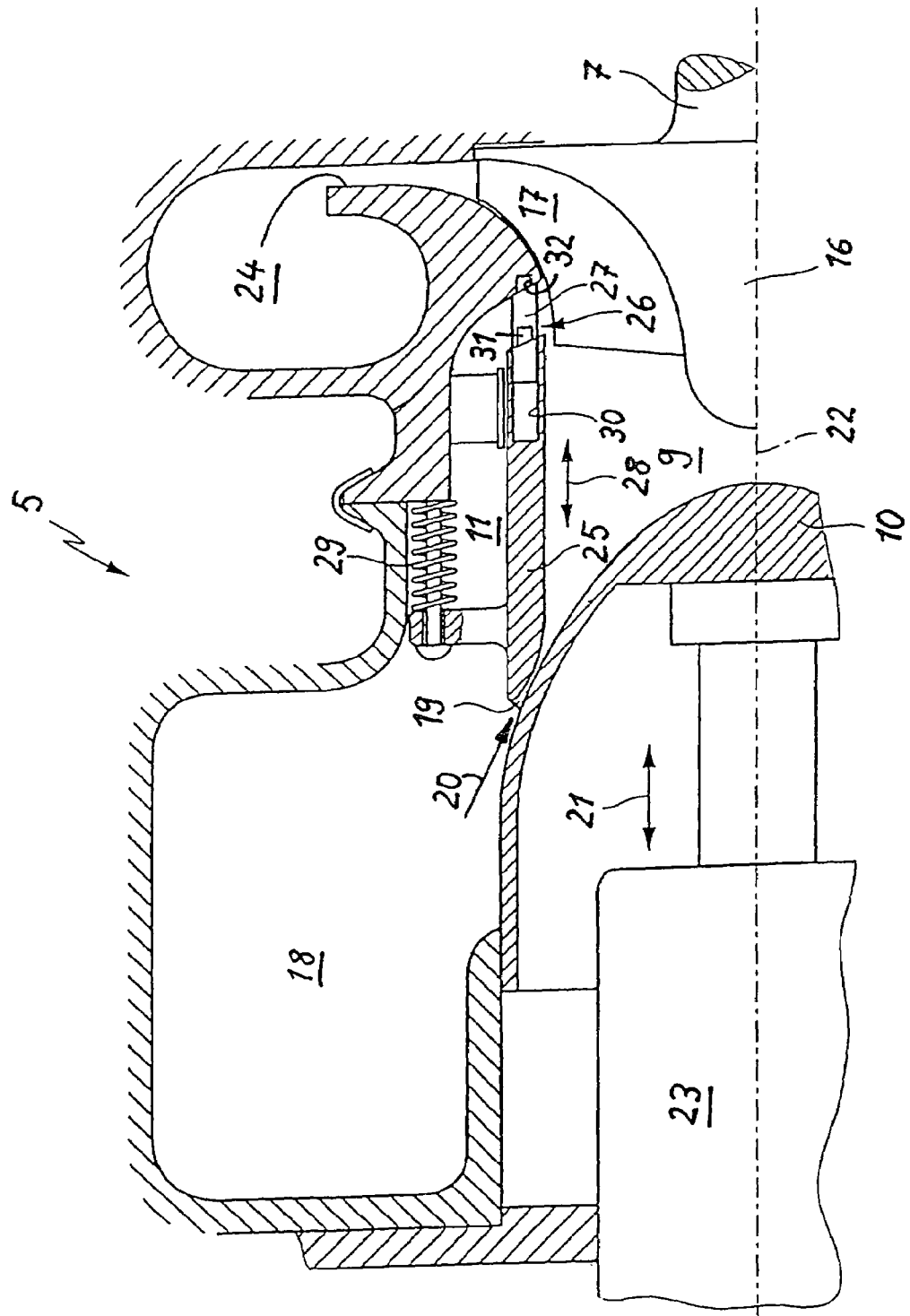
FIG. 2 shows a section of the compressor with the compressor wheel in the compressor inlet duct and the auxiliary duct extending parallel to the compressor inlet duct, the two swirl structures being disposed in the mouth region between the auxiliary duct and the compressor inlet duct.

In FIG. 2, the compressor 5 is represented in a sectional view. The combustion air, which flows from an upstream air-collecting chamber 18 disposed in the compressor housing, via an admission opening 19, the cross section of which is variable and which in FIG. 2 is shown in the closed position, into the axial compressor inlet duct 9, is compressed by the rotating compressor wheel 16 to an increased boost pressure and is radially directed into a diffuser 24 in the compressor housing. From the diffuser 24 the compressed combustion air is conducted through a charge-air cooler 13 represented in FIG. 1 and is then supplied under boost pressure to the cylinders of the internal combustion engine 1. The axis of rotation of the compressor wheel 16 is identical with the compressor axis 22, which is also the longitudinal axis of the compressor inlet duct 9. The upstream air-collecting chamber 18 is configured as an annular space and is radially offset relative to the compressor axis 22. The admission opening 19, which is part of the compressor inlet duct 9 and via which, in the open state, the combustion air flows from the air-collecting chamber 18 in the direction of the arrow 20 into the compressor inlet duct 9, is semiaxially aligned and forms an angle with the compressor axis 22.

In the compressor inlet duct 9 a blocking member 10 is disposed, so as to be axially displaceable in the direction of the arrow 21. Upon axial movement of the blocking member 10 the cross-section of the admission opening 19 can be changed between a closed state as shown in FIG. 2 and an open state in which the combustion air can flow from the air-collecting chamber 18 into the compressor inlet duct 9. The blocking member 10 is axially displaced with the aid of an adjusting member 23.

In the open position of the blocking member 10, the admission opening 19 is formed between the outer contour of the blocking member 10 and an axial slide sleeve 25, which can likewise be displaced in the axial direction and separates the axially extending auxiliary duct 11 from the compressor inlet duct 9. The auxiliary duct 11, at one end, likewise communicates with the air-collecting chamber 18 and, at the other end, joins, via a mouth region 26, the compressor inlet duct 9 radially in the entrance area of the compressor wheel 16. The combustion air supplied via the auxiliary duct 11 strikes the compressor wheel blades 17 in an approximately radial direction and subjects these to an accelerating swirl.

In order to improve the swirl effect, a swirl device is disposed in the mouth region 16 consisting of two separate, yet interacting swirl structures 27 and 31. Each swirl structure comprises guide vanes distributed over the circumference, which influence the flow pattern of the combustion air to the compressor wheel. The first swirl structure 27 is held fixedly and immovably on a wall of the compressor housing which limits the mouth region 26. The second swirl structure 31 is supported on that end face of the axial slide sleeve 25 which forms the opposite wall of the mouth region 26.

The axial slide sleeve 25 and the two swirl structures 27 and 31 jointly form a swirl mechanism, by means of which the flow cross-section of the mouth region 26 can be adjusted between the open position of the slide sleeve 25 as shown in FIG. 2 and a restrictive position in which the mouth cross-section is reduced to a minimum and, if necessary, even completely closed. The mouth cross-section is adjusted by an axial displacement of the axial slide sleeve 25 in the direction the arrow 28. The restrictive position of the mouth region 26 is reached when that end face of the axial slide 25 which limits the mouth region is situated as close as possible to the opposite wall of the mouth region, which wall is part of the compressor housing.

The axial slide sleeve 25 is mounted displaceably on the compressor housing and is biased into its open position by a spring member 29. For the transfer from the open position to the restrictive position, the axial slide sleeve 25 is displaced counter to the spring force of the spring member 29. The guide vanes of the swirl structure 27 supported on the compressor housing are then inserted in opposite axial end-face receiving pockets 30 in the axial slide sleeve 25. Conversely, the guide vanes of the swirl structure 31 supported on the axial slide sleeve 25 can be inserted into receiving pockets 32 formed in the opposite wall of the compressor housing.

The swirl structures 27 and 31 are of different design and have, in particular, different guide vanes. Expediently, the vane height of the two swirl structures, measured in the axial direction of the compressor or along the axial extent of the mouth region, are different in size. For instance, the vane height of the smaller swirl structure 31 is between 5% and 35% of the vane height of the larger swirl structure 27. The larger swirl structure 27 serves as a main swirl structure, the smaller swirl structure 31 serves as an auxiliary swirl structure.

In FIG. 2, the blocking member 10 is shown moved axially to its closing position, in which the admission opening 19 of the compressor inlet duct 9 is shut off. The blocking member 10 is configured as a blocking ram. In the blocking position the outer contour of the blocking member 10 abuts the outer contour of the axial slide sleeve 25, with the result that the admission opening 19 is closed. In the position shown in FIG. 2, the axial slide sleeve 25 is still in its opening position, in which the mouth region 26 is open. In this configuration, the compressor 5 assumes the function of a cold air turbine, since the combustion air flow supplied via the auxiliary duct 11, due to a pressure difference between the compressor inlet and the compressor outlet, drives the compressor wheel 16 and, downstream of the compressor wheel, is expanded to a reduced suction pressure.

In this position, the guide vanes of the main swirl structure 27 span the mouth region 26 between the auxiliary duct 11 and the compressor inlet duct 9, whereby the through-flowing combustion air is subjected to a swirl and, as it strikes the compressor wheel blades 17, a drive momentum is imparted to the compressor wheel 16. Due to their narrower construction, however, the guide vanes of the auxiliary swirl structure 31 extend only slightly into the mouth region 26, with the result that the flow cross section remains largely uninfluenced by the auxiliary swirl structure 31.

Upon a further axial displacement of the blocking member 10 toward the compressor wheel 16, the axial slide sleeve 25 is also displaced in this direction, with the result that the cross-sectional area of the mouth region 26 is reduced and, if necessary, completely blocked off. The guide vanes of the main swirl structure 27 are hereupon inserted in the receiving pockets 30 in the end face of the axial slide sleeve 25. At the same time, the guide vanes of the auxiliary swirl structure 31 approach the opposite wall on the compressor housing. When this wall is reached, the mouth region 26 has a minimal open flow cross section, in which the guide vanes of the two swirl structures 27 and 31 determine the flow cross-section in the mouth region. In this position, too, the compressor assumes a cold air turbine mode of operation, the smallest flow cross-section being intended for the lowest loads and speeds of the internal combustion engine.

If the blocking member 10 and the axial slide sleeve 25 are moved still further toward the compressor wheel 16, the guide vanes of the auxiliary swirl structure 31 are inserted in their receiving pockets 32 in the region of the wall of the compressor housing, with the result that the flow cross-section of the mouth region 26 is completely closed off.

Figure 3:
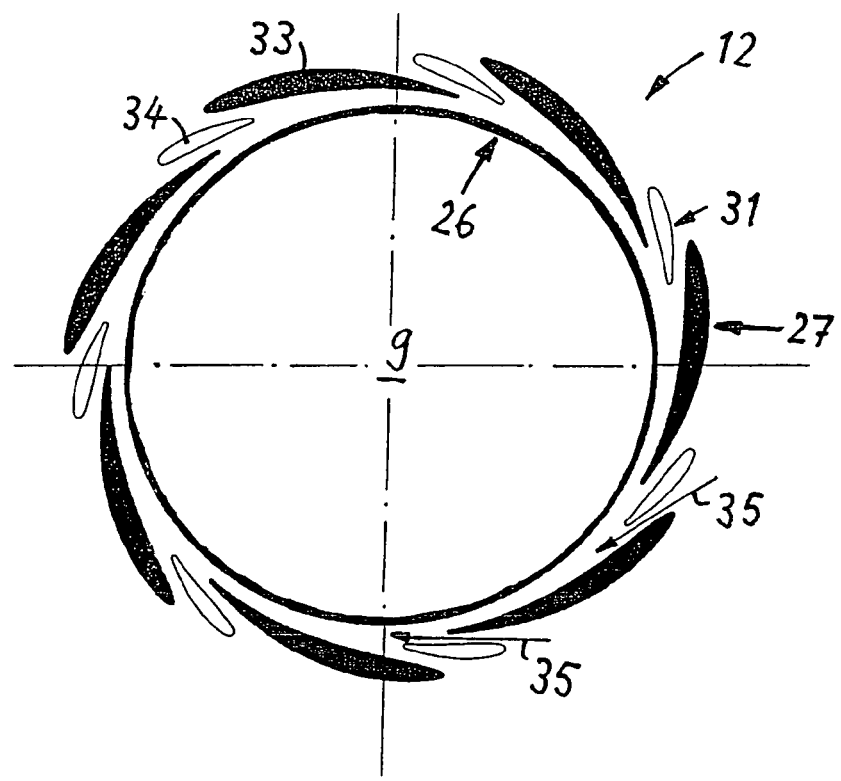
FIG. 3 shows schematically a section of two interacting swirl structures having differently shaped swirl structures.

In FIG. 3, a swirl device 12 with the swirl structures 27 and 31 inserted one inside the other is schematically shown. The main swirl structure 27 has larger guide vanes 33 distributed over the circumference, the auxiliary swirl structure 31 has smaller guide vanes 34 distributed over the circumference. In the telescoped position of the swirl device the smaller guide vanes 34 extend into the interspaces between adjacent larger guide vanes 33. Hence, the free flow cross section of the mouth region 26 is reduced and also the shape of the flow cross section is influenced. The combustion air supplied via the auxiliary duct flows in the direction of the arrow 35 through the interspaces between adjacent guide vanes 33 and 34. The smaller guide vanes 34 are spaced from larger guide vanes 33 in the region of the two vane ends, so that on both the outer side and inner side of the smaller guide vanes 34 free flow channels are obtained, through which combustion air can flow. The representation shown in FIG. 3, just like that according to FIG. 4 and FIG. 5, corresponds to the axially telescoped position of the two swirl structures, which position marks the position at the lowest loads and speeds of the internal combustion engine.

Figure 4:
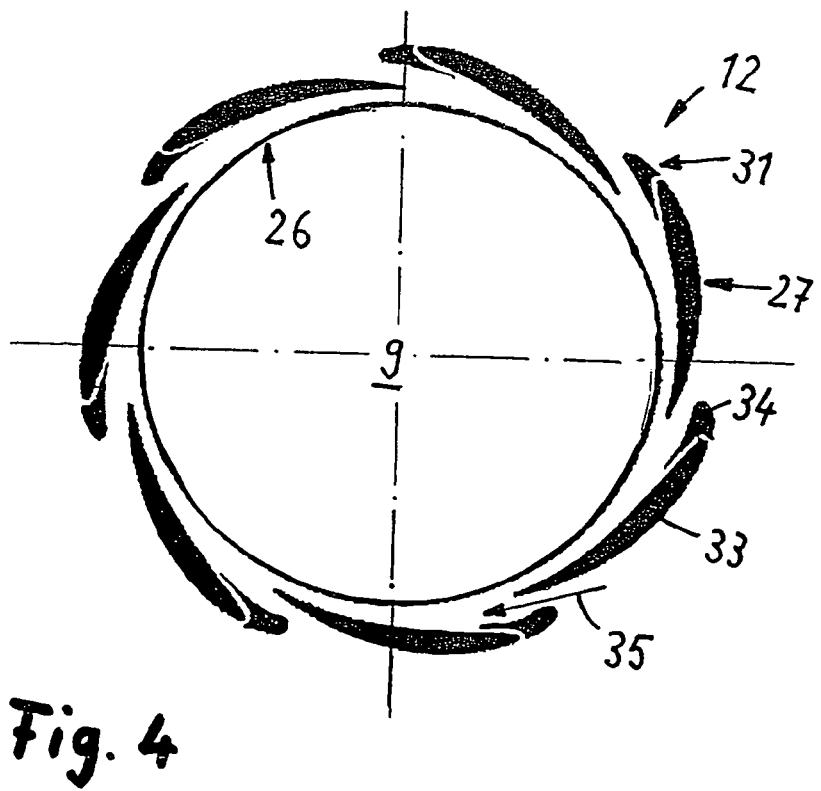
FIG. 4 is a representation corresponding to FIG. 3, but with one of the two swirl structures being of differing design.
Figure 5:
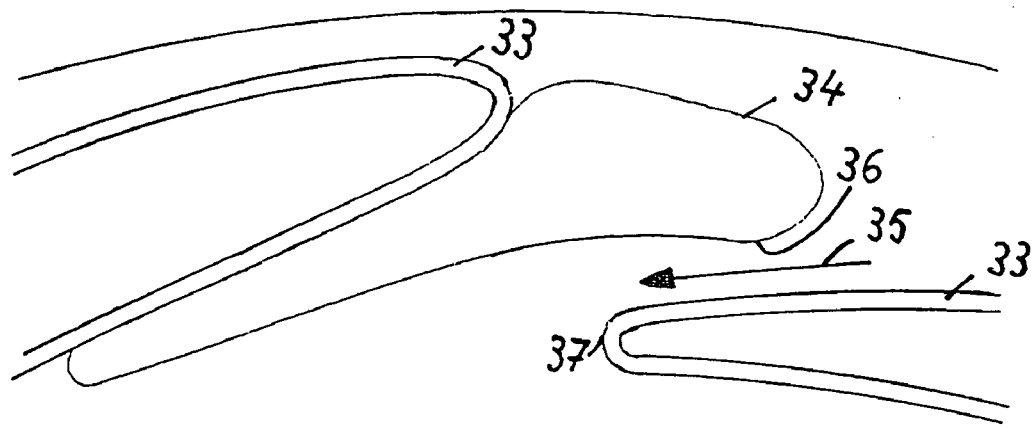
FIG. 5 shows a detailed enlargement of two interacting swirl structures of FIG. 4.

In FIGS. 4 and 5, the two swirl structures 27 and 31 form with their guide vanes 33 and 34 a supersonic swirl device, in which the smaller guide vanes 34 are disposed on the front end face of the larger guide vanes 33. Between, respectively, a smaller guide vane 34 and an adjacent, larger guide vane 33, a Laval nozzle channel is formed, in which a stable supersonic flow can be formed. The narrowest flow cross section lies in the region of an outer nose 36 of the smaller vane 34, the nose 36 being disposed in the peripheral direction at a distance from the rear edge 37 of the larger, adjacent guide vane 33. The mutually facing walls of the vanes 33 and 34 form a diffuser-shaped Laval nozzle channel, thereby aiding the supersonic flow.

Figure 6:
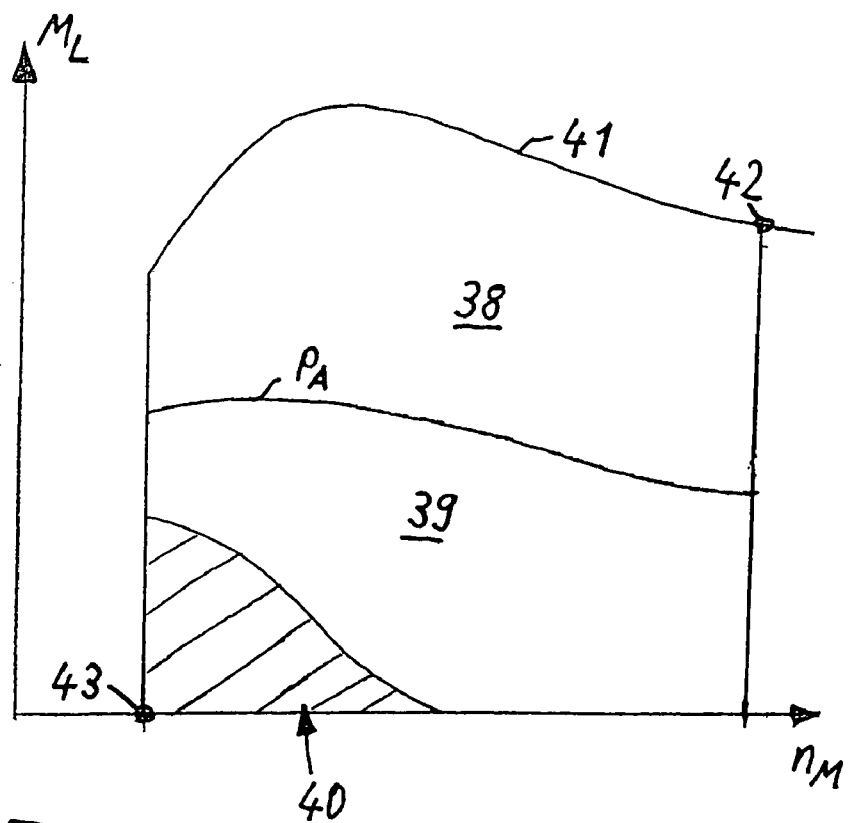
FIG. 6 shows a graph displaying an engine characteristic curve, in which various load curves are represented as a function of the engine speed.

FIG. 6 is a graph showing the load pattern $M_L$ of the internal combustion engine as a function of the engine speed $n_M$. Recorded are an upper supercharging zone 38, which is characterized by an overpressure in the induction tract, and an operating zone 39 of a naturally aspirated engine, in which zone, in the induction tract directly in front of the cylinder inlets, an underpressure is present. The two zones are separated by a curve marking the ambient pressure $p_A$. Within the operating zone 39 of the naturally aspirated engine the compressor is operated during low engine loads and speeds in a cold air turbine mode. In the hatched low load region 40, the two swirl structures determine the flow cross-section in the mouth region of the auxiliary duct to the compressor inlet duct. In the other regions of the operating zone 39 of the naturally aspirated engine, the flow cross-section of the mouth region, by contrast, is solely or mainly influenced by the larger main swirl structures 27.

The entire operating range extends between an idling point 43, which marks the idling speed in the no-load state, and a rated power point 42 on a full-load curve 41, the rated power point 42 marking the rated horsepower of the internal combustion engine at rated speed. The full-load curve 41 limits the supercharging zone 38 upward in the direction of maximum loads.

What is claimed is:

1. An intake air compressor in the induction tract of an internal combustion engine, including a compressor wheel (16) rotatably supported in a compressor housing having an inlet duct (9) leading to the compressor wheel (16) for the compression of combustion air to an increased boost pressure, and an adjustable swirl device (12) disposed in the flow path of the combustion air to the compressor wheel (16), said swirl device (12) comprising two separate, interacting swirl structures (27, 31) each with a plurality of guide vanes (33, 34) distributed over the circumference of the swirl device (12), the flow cross-section between the guide vanes (33, 34) of the two swirl structures (27, 31) being adjustable by an adjusting motion force acting on at least one of the swirl structures (27, 31), the vane height of the guide vanes (33, 34) of the two swirl structure (27, 31), measured in the axial direction being different in size, the vane height of the guide vanes (34) of the smaller swirl structure (31) being 5% to 35% of the vane height of the guide vanes (33) of the larger swirl structure (27).

2. The compressor as claimed in claim 1, wherein an auxiliary duct (11) is provided, which joins the compressor inlet duct (9), the two swirl structures (27, 31) being disposed in a mouth region (26) of the auxiliary duct (11) merging with the compressor inlet duct (9).

3. The compressor as claimed in claim 2, wherein the auxiliary duct (11) merges with the compressor inlet duct (9) in the axial direction in the area of the compressor wheel (16).

4. The compressor as claimed in claim 2, wherein at least one swirl structure (31) is axially displaceable.

5. The compressor as claimed in claim 4, wherein one swirl structure (27) is supported on the compressor housing and the other swirl structure (31) is supported on an axial slide sleeve (25).

6. The compressor as claimed in claim 4, wherein the guide vanes (33, 34) Of the two swirl structures (27, 31) are movable into receiving pockets (30, 32) formed in opposite wall portions of the wall forming the mouth region.

7. The compressor as claimed in claim 1, wherein the guide vanes (33, 34) of at least one swirl structure (27, 31) are fastened to an axial slide sleeve (25) for movement therewith.

8. The compressor as claimed in claim 7, wherein an adjustable blocking member (10) is disposed in the compressor inlet duct (9) upstream of the compressor wheel (16) for adjusting the flow cross-section of the compressor inlet duct (9), the blocking member (10) being movable into contact with the sleeve (25) carrying the swirl structure (31) for transmitting an adjusting motion to the swirl structure (31).

9. The compressor as claimed in claim 1, wherein, in a position providing reduced flow cross-section, the guide vanes (34) of one swirl structure (31) are disposed between the guide vanes (33) of the other swirl structure (27).

10. The compressor as claimed in claim 1, wherein, in a position providing reduced flow cross-section, the guide vanes (34) of one swirl structure (31) are disposed on the end face of the guide vanes (33) of the other swirl structure (27).

11. An exhaust gas turbocharger having an intake air compressor in the induction tract of an internal combustion engine, including a compressor wheel (16) rotatably supported in a compressor housing having an inlet duct (9) leading to the compressor wheel (16) for the compression of combustion air to an increased boost pressure, and an adjustable swirl device (12) disposed in the flow path of the combustion air to the compressor wheel (16), said swirl device (12) comprising two separate, interacting swirl structures (27, 31) each with a plurality of guide vanes (33, 34) distributed over the circumference of the swirl device (12), the flow cross-section between the guide vanes (33, 34) of the two swirl structures (27, 31) being adjustable by an adjusting motion force acting on at least one of the swirl structures (27, 31), the vane height of the guide vanes (33, 34) of the two swirl structure (27, 31), measured in the axial direction being different in size, the vane height of the guide vanes (34) of the smaller swirl structure (31) being 5% to 35% of the vane height of the guide vanes (33) of the larger swirl structure (27) and an exhaust gas turbine (3) in the exhaust gas system of the internal combustion engine to which the compressor is connected.

12. The exhaust gas turbocharger as claimed in claim 11, wherein the exhaust gas turbine (3) is equipped with a variable turbine geometry (8) for the adjustment of the effective turbine inlet cross-section.

* * * * *